(12) United States Patent
Mirfakhraei et al.

(10) Patent No.: US 10,797,805 B1
(45) Date of Patent: Oct. 6, 2020

(54) OPTIMIZED FREQUENCY SEARCHING FOR SIMULTANEOUSLY RECEIVED PACKET DETECTION

(71) Applicant: Cisco Technology, Inc., San Jose, CA (US)

(72) Inventors: Khashayar Mirfakhraei, Los Altos, CA (US); Ardalan Alizadeh, San Jose, CA (US); Xu Zhang, Fremont, CA (US); Gautam Dilip Bhanage, Milpitas, CA (US); Daniel Joseph Lyons, Medina, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/521,109

(22) Filed: Jul. 24, 2019

(51) Int. Cl.
| | |
|---|---|
| *G06N 99/00* | (2019.01) |
| *H04L 12/24* | (2006.01) |
| *H04W 24/04* | (2009.01) |
| *H04B 17/10* | (2015.01) |
| *G06N 3/08* | (2006.01) |
| *H04L 29/08* | (2006.01) |
| *H04W 88/12* | (2009.01) |
| *H04W 88/08* | (2009.01) |

(52) U.S. Cl.
CPC ............. *H04B 17/10* (2015.01); *G06N 3/08* (2013.01); *H04L 67/10* (2013.01); *H04W 88/08* (2013.01); *H04W 88/12* (2013.01)

(58) Field of Classification Search
None
See application file for complete search history.

(56) References Cited

U.S. PATENT DOCUMENTS

| 7,457,366 | B2 | 11/2008 | Maltsev et al. | |
|---|---|---|---|---|
| 7,764,931 | B2* | 7/2010 | Kim | H04B 7/0417 370/295 |
| 8,107,561 | B2 | 1/2012 | Huang et al. | |
| 8,111,770 | B1 | 2/2012 | Moon et al. | |
| 8,995,410 | B2 | 3/2015 | Balan et al. | |
| 9,425,836 | B2 | 8/2016 | Wang et al. | |
| 9,432,901 | B1* | 8/2016 | Kwan | H04L 41/147 |

(Continued)

OTHER PUBLICATIONS

U.S. Appl. No. 16/299,487, Unpublished (filed Mar. 12, 2019), Cisco Technology Inc.

(Continued)

*Primary Examiner* — Tuan A Tran
(74) *Attorney, Agent, or Firm* — Behmke Innovation Group LLC; James M. Behmke; Jonathon P. Western

(57) ABSTRACT

In one embodiment, a process tracks measured carrier frequency offsets (CFOs) of identified transmitters over a period of activity of the identified transmitters, and determines predicted CFOs for the identified transmitters and predicted transmitter behavior as a probability of specific transmitters of the identified transmitters being active at given times based on the activity of the identified transmitters. The process may then determine, based on the predicted CFOs and predicted transmitter behavior, CFO ranges that a receiver should expect for upcoming packets, and instructs the receiver to use the CFO ranges as a prioritized list of dynamically selected CFOs to use to extract single or colliding packets from among potential interferences using frequency demodulation.

20 Claims, 9 Drawing Sheets

(56) References Cited

U.S. PATENT DOCUMENTS

| | | | |
|---|---|---|---|
| 9,467,986 B2 | 10/2016 | Lyons | |
| 9,544,201 B2* | 1/2017 | Sanchez Vega | H04L 41/0893 |
| 9,559,809 B2* | 1/2017 | Visoz | H04L 1/0071 |
| 9,674,724 B2* | 6/2017 | Kim | H04B 7/024 |
| 9,866,416 B2 | 1/2018 | Lyons | |
| 9,867,108 B2* | 1/2018 | Kobayashi | H04W 16/08 |
| 10,070,362 B2* | 9/2018 | Kwan | H04W 36/165 |
| 10,117,142 B2* | 10/2018 | Padfield | H04W 36/20 |
| 10,154,417 B2* | 12/2018 | Huang | H04W 16/26 |
| 10,211,943 B2* | 2/2019 | Morkel | H04J 14/0227 |
| 10,225,313 B2* | 3/2019 | Arunachalam | H04L 67/18 |
| 10,277,476 B2* | 4/2019 | Mermoud | H04L 41/5025 |
| 10,333,854 B2* | 6/2019 | Chen | H04L 69/22 |
| 10,440,603 B2* | 10/2019 | Nuss | H04W 72/0486 |
| 10,470,078 B2* | 11/2019 | Murphy | H04W 28/08 |
| 10,643,153 B2* | 5/2020 | O'Shea | H04W 24/08 |
| 2004/0198360 A1* | 10/2004 | Kotzin | H04W 48/18 455/445 |
| 2009/0219992 A1* | 9/2009 | Wang | H04B 17/373 375/240.03 |

OTHER PUBLICATIONS

Tim O'Shea et al., "Learning Approximate Neural Estimators for Wireless Channel State Information," https://arxiv.org/pdf1707.06260.pdf, Jul. 19, 2017, 6 pages.

Horia Vlad Balan et al., "AirSync: enabling Distributed Multiuser MIMO with Full Spatial Multiplexing," http://ceng.usc.edu/techreports/2012/Psounis%20CENG-2012-1.pdf, 2012, 15 pages.

H.V. Balan et al., "AirSync: enabling Distributed Multiuser MIMO with Full Spatial Multiplexing," IEEE/ACM Transactions on Networking, vol. 21, No. 6, https://ieeexplore.ieee.org/stamp/stamp.jsp?tp=&arnumber=6403902, Dec. 2013, pp. 1681-1695.

H. Kim et al., "Tracking Low-Precision Clocks with Time-Varying Drafts Using Kalman Filtering," IEEE Transactions on Networking, vol. 20, No. 1, Feb. 2012, pp. 257-270.

G. Xu et al., "User behavior prediction model for smart home using parallelized neural network algorithm," 2016 IEEE International Conference on Computer Supported Cooperative Work in Design (CSCWD), 2016, pp. 221-226.

W. Lin et al., "Adaptive Carrier Synchronization Using Decision Aided Kalman Filtering Algorithms," IEEE Transactions on Consumer Electronics, vol. 53, No. 4, Nov. 2007 pp. 1260-1267.

* cited by examiner

OPTIMIZED FREQUENCY SEARCHING FOR SIMULTANEOUSLY RECEIVED PACKET DETECTION

TECHNICAL FIELD

The present disclosure relates generally to computer networks and wireless communication, and, more particularly, to optimized frequency searching for simultaneously received packet detection.

BACKGROUND

Technologies exist today which support simultaneous reception of collided packets, such as the proprietary "EverScale" technology available from Cisco Systems, Inc. of San Jose, Calif. The decoding process of such technology hinges on the correct estimation/searching of the carrier frequency offset (CFO) of the transmitters of the collided packets. Current design is based on an exhaustive search over a possible CFO range, which is time consuming and may incur additional complexity to the design.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
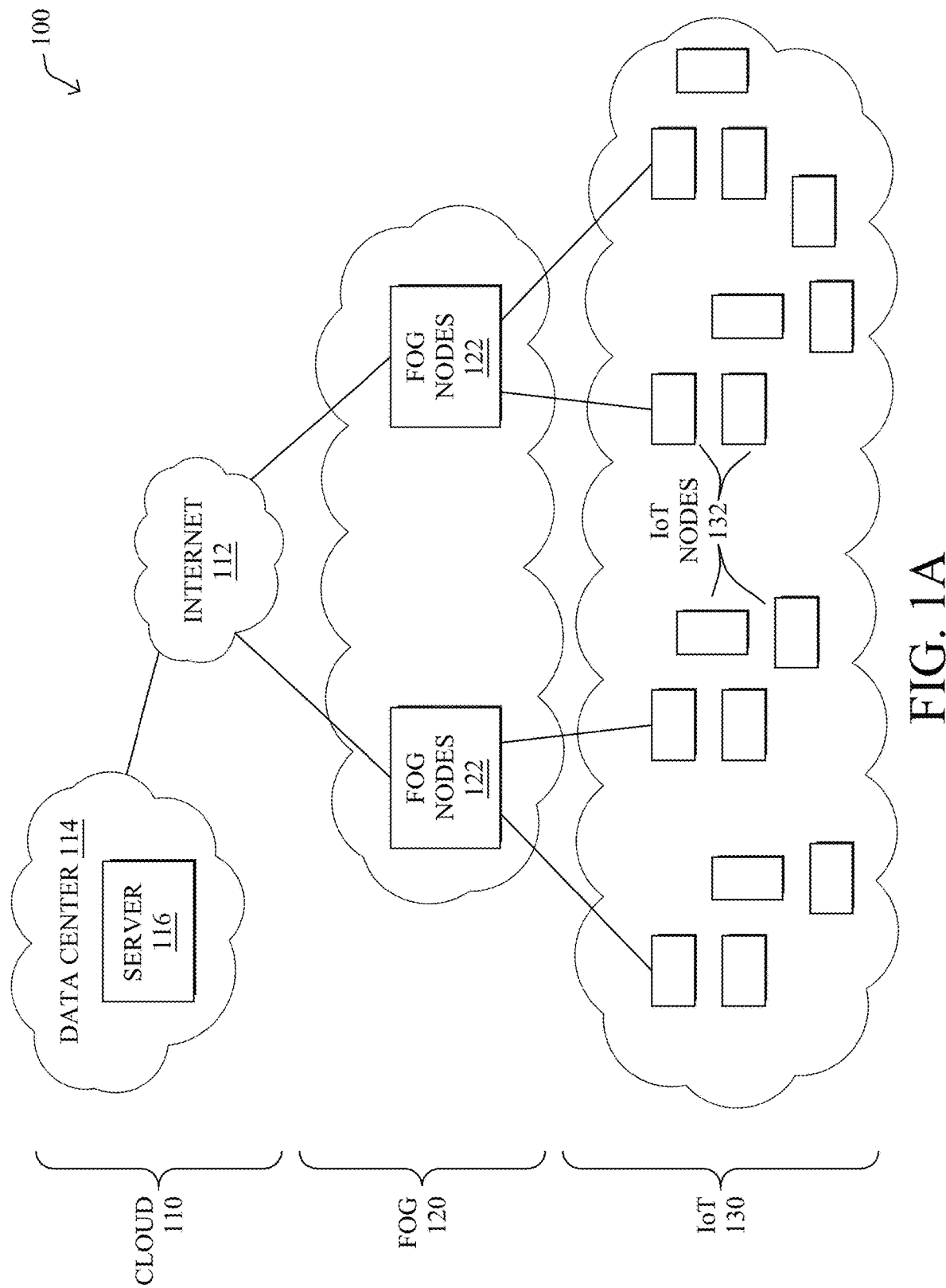
FIGS. 1A-1B illustrate an example communication network.

According to one or more embodiments of the disclosure, a process tracks measured carrier frequency offsets (CFOs) of identified transmitters over a period of activity of the identified transmitters, and determines predicted CFOs for the identified transmitters and predicted transmitter behavior as a probability of specific transmitters of the identified transmitters being active at given times based on the activity of the identified transmitters. The process may then determine, based on the predicted CFOs and predicted transmitter behavior, CFO ranges that a receiver should expect for upcoming packets, and instructs the receiver to use the CFO ranges as a prioritized list of dynamically selected CFOs to use to extract single or colliding packets from among potential interferences using frequency demodulation.

According to one or more additional embodiments of the disclosure, a process tracks measured wireless transmission properties of identified transmitters over a period of activity of the identified transmitters, and determines predicted wireless transmission properties for the identified transmitters as well as predicted transmitter behavior as a probability of specific transmitters of the identified transmitters being active at given times based on the activity of the identified transmitters. The process may then determine, based on the predicted wireless transmission properties and predicted transmitter behavior, wireless reception properties that a receiver should expect for upcoming packets, and instructs the receiver to use the wireless reception properties as a prioritized list of dynamically selected wireless reception properties to use to receive incoming packets.

Other embodiments are described below, such as optionally including an identity of an upstream interaction of an interaction instance, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication (PLC) networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Generally, size and cost constraints on smart object nodes (e.g., sensors) result in corresponding constraints on resources such as energy, memory, computational speed and bandwidth.

Networks may also be, or may include, an "Internet of Things" or "IoT" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, high bit error rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer or hierarchy of layers from local networks (e.g., IoT networks) to the cloud (e.g., centralized and/or shared resources, as will be understood by those skilled in the art). That is, generally, fog computing entails using devices at the network edge to provide application services, including computation, networking, and storage, in close proximity to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple peer-to-peer and hierarchical layers of fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT layer 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Figure 1B:
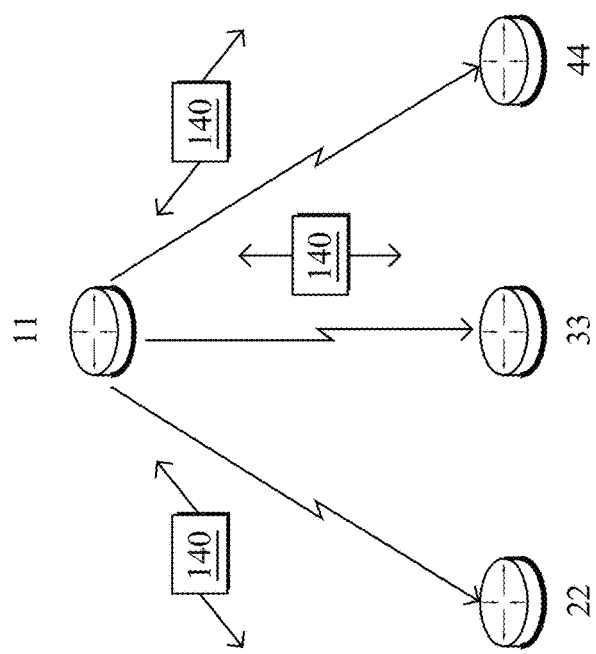

FIG. 1B is a schematic block diagram of an example (and vastly simplified) portion of computer network 100 (e.g., wireless connectivity) illustratively comprising nodes/devices 200 (e.g., labeled as shown, "11," "22," "33," and "44") interconnected by wireless communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the computer network 100, and that the view shown herein is for simplicity (particularly, that while routers are shown, any wireless communication devices 11-44 may be utilized).

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, RF, etc.) over wireless/RF links 105. Note that the communication may, in certain embodiments, be based on dual PHY links such as, for example, RF links and wired/PLC links, and the view shown herein in simplified for illustration. As used herein, PHY refers to the physical layer of the OSI model. In this context, a protocol consists of a set of rules defining how the nodes interact with each other.

In one embodiment, for example, the node/device labeled as "11" in FIG. 1B may comprise an access point (AP) that, in accordance with IEEE 802.11 communication standards, communicates with other nodes/devices (labeled as shown, "22," "33," and "44" in FIG. 1B). In particular, the AP and the client devices may include one or more communications antennas. The one or more communications antennas may be any suitable type of antennas corresponding to, for example, the IEEE 802.11 communication standards. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component(s) to transmit and/or receive signals, such as communications signals among the AP and the client devices.

In one embodiment, the AP and the client devices may be configured to perform directional transmission and/or directional reception in conjunction with wirelessly communicating in a wireless network. Such directional transmission and/or reception can be performed using a set of multiple antenna arrays (e.g., DMG antenna arrays or the like). Each of the multiple antenna arrays may be used for transmission and/or reception in a particular respective direction or range of directions. The AP and the client devices be configured to perform any given directional transmission a) towards one or more defined transmit sectors and/or b) from one or more defined receive sectors. Additionally, MIMO beamforming in the computer network 100 may be accomplished using radio frequency (RF) beamforming and/or digital beamforming. For example, the AP and the client devices may be configured to use all or a subset of its one or more communications antennas to perform MIMO beamforming.

The AP and the client devices may include any suitable radio component(s) for transmitting and/or receiving RF signals in a bandwidth and/or channel corresponding to the communications protocols utilized by the AP and the client devices. The radio component(s) may include hardware and/or software to modulate and/or demodulate communications signals according to pre-established transmission protocols. The radio component(s) may further have hardware and/or software instructions to communicate via one or more IEEE 802.11 communication standards. For example, the radio component(s), in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). In another example, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component(s) may include any known receiver and baseband suitable for communicating via the communications protocols. Further, the radio component(s) may include a low noise amplifier (LNA), additional signal amplifiers, an analog-to-digital (A/D) converter, one or more buffers, digital baseband(s), switches, etc.

Figure 1B:
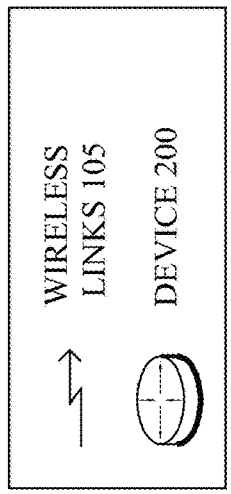
Figure 2:
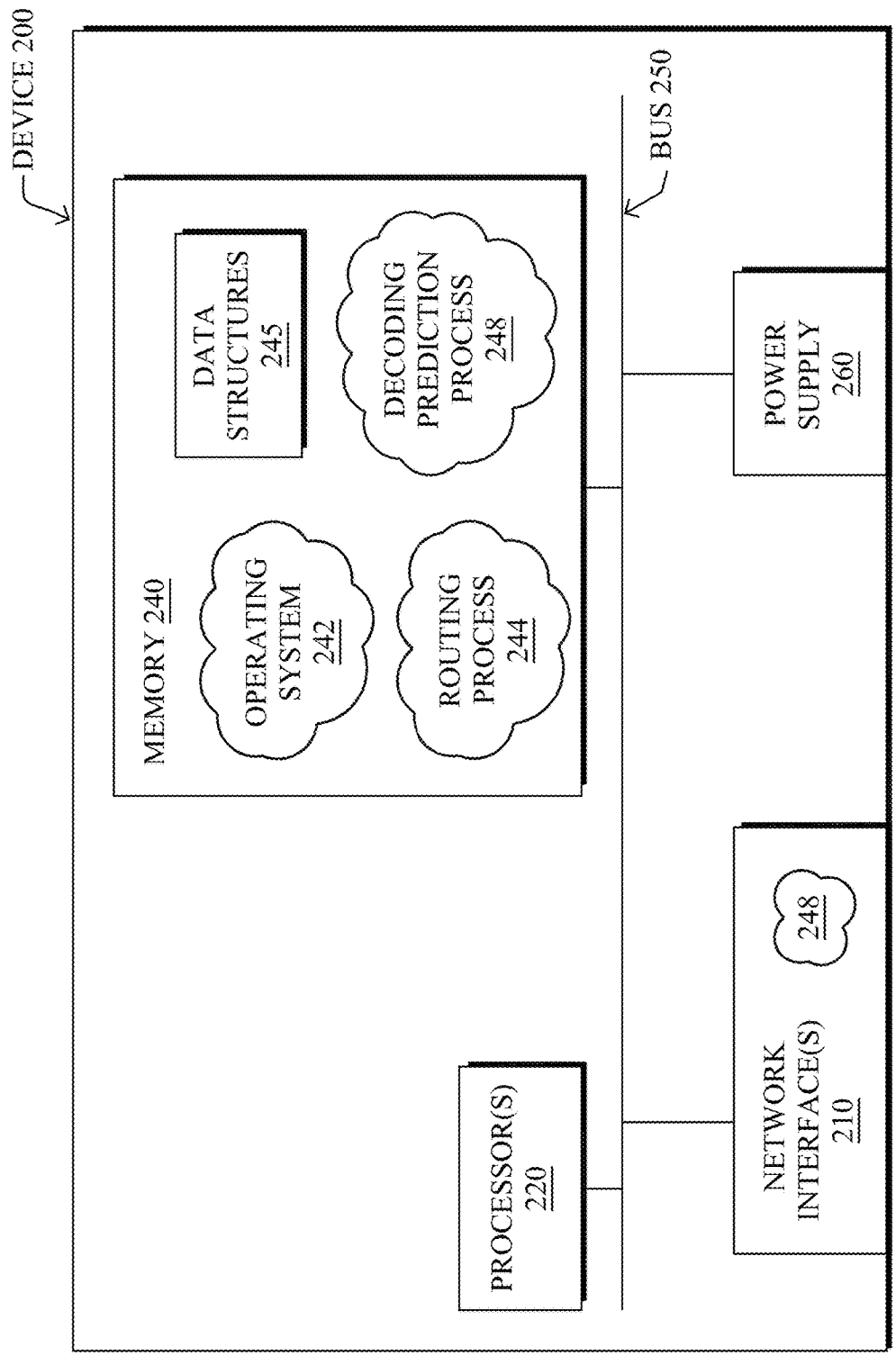
FIG. 2 illustrates an example network device/node.

FIG. 2 is a schematic block diagram of an example node/device 200 that may be used with one or more embodiments described herein, e.g., as any of the nodes/devices shown in FIG. 1 above. The device may comprise one or more network interfaces 210 (e.g., wired, wireless, power-line communication (PLC), etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise a routing process 244 and an illustrative "decoding prediction" process 248, as described herein. Note that while process 248 is shown in centralized memory 240 alternative embodiments provide for the process to be specifically operated within the network interface(s) 210.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Optimized Frequency Searching for Simultaneously Received Packets——

As noted above, technologies exist today which support simultaneous reception of collided packets, such as the proprietary "EverScale" technology available from Cisco Systems, Inc. of San Jose, Calif., which extracts (demodulates) different transmission signals from different client devices sent at overlapping times. In particular, the Ever-Scale example technology is described in greater detail in commonly owned U.S. Pat. No. 9,467,986 issued on Oct. 11, 2016, and U.S. Pat. No. 9,866,416 issued on Jan. 9, 2018, both entitled SYSTEM AND METHOD FOR SIMULTANEOUS COMMUNICATION WITH MULTIPLE WIRELESS COMMUNICATION DEVICES and filed by Daniel Joseph Lyons, which state that simultaneous communication with multiple wireless communication devices may comprise: receiving, using a plurality of antennas at a first wireless station, a plurality of packets, comprised of orthogonal frequency division multiplexing (OFDM) wireless signals, transmitted simultaneously from a plurality of other wireless stations wherein each of the simultaneously transmitted packets includes a plurality of frequency tones, frequency domain transform the received packets; grouping frequency domain transform outputs for each subcarrier; determining a difference between subcarrier groups formed over different sample sets; and determining a set of weights for each subcarrier, wherein the weights are selected such that the first wireless station can at least one of detect or demodulate the received plurality of packets.

Said differently, multi-user receiver technology, such as the illustrative EverScale technology, enables the blind detection and demodulation of colliding orthogonal frequency-division multiplexing (OFDM) signals (OFDM is a method of digital signal modulation in which a single data stream is split across several separate narrowband channels at different frequencies to reduce interference and crosstalk). Whereas a conventional receiver can demodulate only a single OFDM signal and will most likely fail to demodulate any signals when multiple OFDM signals arrive at once, EverScale provides the ability to potentially recover all OFDM signals simultaneously. As a result, such simultaneous reception technology provides significant improvement to physical layer robustness in high density 802.11 environments where multiple OFDM frequently do collide in practice.

However, as also noted above, the decoding process of such technologies, including the illustrative EverScale technology hinges on the correct estimation/searching of the carrier frequency offset (CFO) of the transmitters of the collided packets. That is, current design is based on a granular and exhaustive search over a possible CFO range (e.g., an entire spectrum of possible frequencies), which is time consuming and may incur additional complexity to the design.

The techniques herein, therefore, provide a CFO prediction hybrid mechanism utilizing machine learning (ML), referred to as "ML-based CFO prediction", to reduce the complexity of this exhaustive search. That is, the framework proposed herein facilitates the operation of a multi-packet 802.11 receiver (e.g., the illustrative EverScale technology) in demodulating and decoding multiple collided packets through predictive learning, allowing the multi-packet receiver to operate more efficiently, both with regards to latency and complexity (memory and processing cycles) at the access point (AP) and/or digital signal processor (DSP) level.

Specifically, according to one or more embodiments of the disclosure as described in detail below, a process tracks measured carrier frequency offsets (CFOs) of identified transmitters over a period of activity of the identified transmitters, and determines predicted CFOs for the identified transmitters and predicted transmitter behavior as a probability of specific transmitters of the identified transmitters being active at given times based on the activity of the identified transmitters. The process may then determine, based on the predicted CFOs and predicted transmitter behavior, CFO ranges that a receiver should expect for upcoming packets, and instructs the receiver to use the CFO ranges as a prioritized list of dynamically selected CFOs to use to extract single or colliding packets from among potential interferences using frequency demodulation.

Illustratively, the techniques described herein may be performed by hardware, software, and/or firmware, such as in accordance with the decoding prediction process 248, which may include computer executable instructions executed by the processor 220 (or independent processor of interfaces 210) to perform functions relating to the techniques described herein, e.g., in conjunction with one or more receivers/network interfaces.

Notably, the techniques herein may employ any number of machine learning techniques, such as to predict CFOs and transmitter behavior as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The decoding process of multi-packet receivers (e.g., EverScale technology) is based on differential vector computation. The receiver generates a vector which consists of the difference between the received signal and its rotated version over all antennas. Then, it finds the null space of these calculated differential vectors. The correct estimation of this rotation, i.e., carrier frequency offset (CFO), enables the desired signal to be extracted, out of the amalgam of colliding 802.11 signals at the receiver, considering certain periodic characteristic of the selected quadrature (e.g., IQ) samples. In fact, the estimated frequency offset provides "frequency demodulation" of desired packet among multiple interference transmitters.

Figure 3:
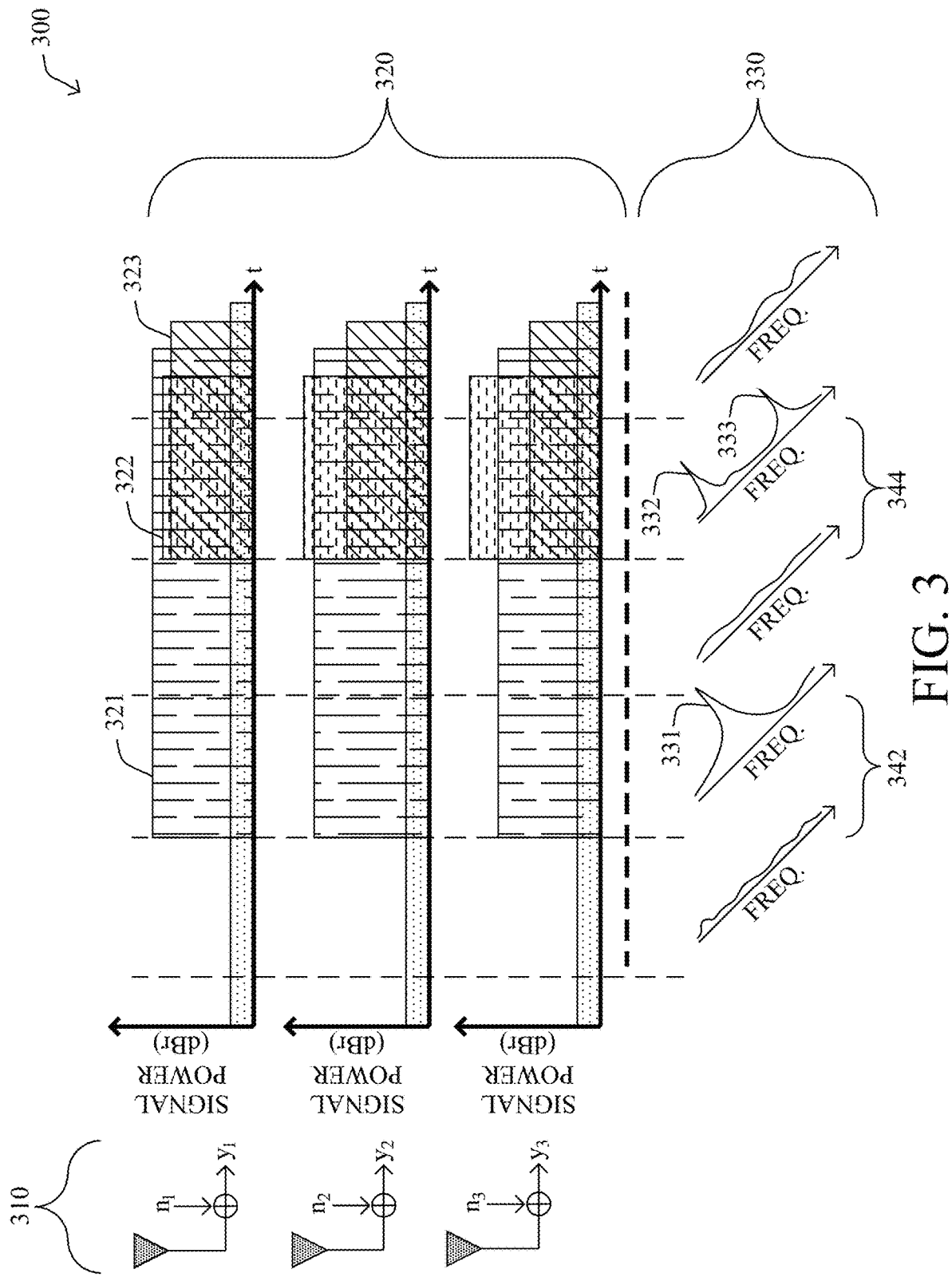
FIG. 3 illustrates an example of multi-packet receiver 802.11 OFDM start of packet (SoP) detection.

FIG. 3 illustrates an example 300 of multi-packet receiver (e.g., EverScale) 802.11 OFDM start of packet (SoP) detection. In particular, as shown, assume that three antennas 310 receive signal powers 320 as shown. Start of packet (SoP) detection algorithms can be used to determine the frequencies 330 and times at which signals start (e.g., signal 321 at frequency 331 starting at time 342, and signals 321 and 323 of respective frequencies 331 and 333 starting at time 344, as shown.

Figure 4:
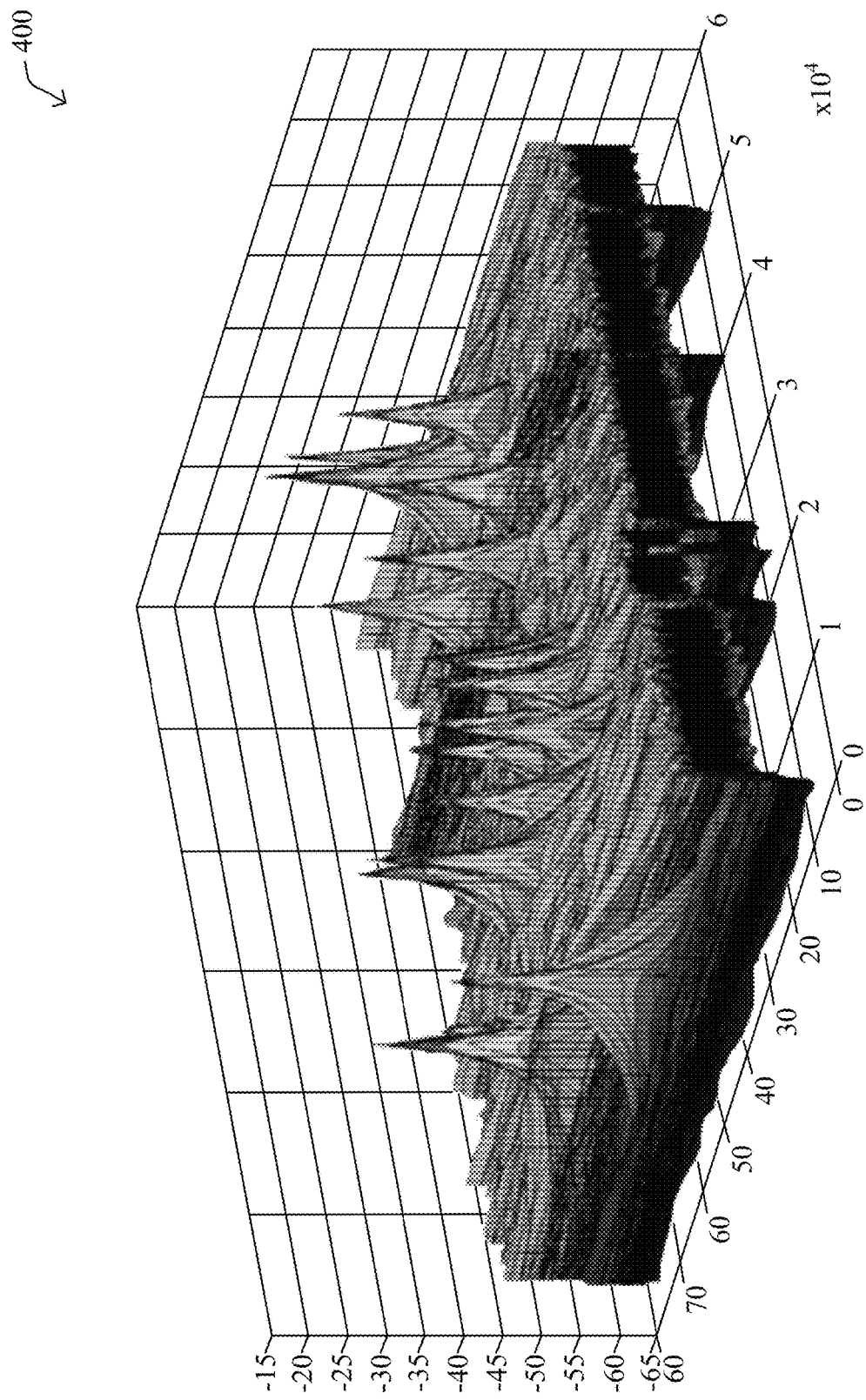
FIG. 4 illustrates an example of multi-packet receivers 802.11 OFDM 2D (time+frequency) SoP detection.

More precisely, prior to demodulating a particular 802.11 OFDM signal, multi-packet receivers (like EverScale) must first resolve the frequency and approximate time of potential packets to demodulate. With no a-priori knowledge of the time and frequency offsets of the OFDM packets to demodulate, multi-packet receivers could blindly do two-dimensional (2D) searches through all potential frequency and time offsets for all possible packets. Doing so would provide a 2D grid of potential packet time and frequency offset candidates as illustrated in FIG. 4, showing a graph 400 of a multi-packet receiver SoP detection algorithm being executed over a signal of approximately 20 milliseconds in duration. Although this method of detecting packets as shown would provide the optimal results, the amount of computational complexity to implement this technique of blind 2D detection is much larger than what could be implemented through the techniques described herein without having significant increases to product cost.

Note that as an alternative to the 2D (time+frequency search) approach above, an alternative which is not feasible, a multi-packet receiver could instead make the compromise of performing a time domain only interference change search to determine points at which new packets have likely started. At these points where packets or some other wireless source has likely started, multi-packet receivers could perform a 1D search at all potential frequency offsets. The problems with this approach, however, are that multi-packet receivers can potentially "miss" packets if a new packet arrives while start of packet detection frequency search processing is occurring for a previous packet, or that even with a 1D search, the amount of processing required to determine the frequency offset of a packet is non-trivial and generally requires custom hardware to be implemented into vendor solutions to enable multi-packet receiving.

According to the techniques described herein, therefore, significantly reducing the processing burden for multi-packet receivers' start of packet (SoP) detection would help to ease the cost/power of implementing multi-packet receiver technology into wireless chipsets, and could move multi-packet receiver SoP processing from a hardware IP blocks to a software solution capable of being implemented in a digital signal processor (DSP). In particular, the techniques described below provide a prioritized list of frequency offsets (e.g., two to five, as an illustration) at which the next packet or packets is/are most likely to occur, thus reducing required processing of multi-packet receivers (e.g., by a factor of roughly 10× over the pure 1D search) and making simultaneously received packet detection a more feasible technology to implement.

Notably, carrier frequency offset (CFO) is due to the independent free running crystal oscillators that generate the modulation/demodulation harmonics for the transmitter and the receiver. The difference between the two frequencies is the aforementioned offset. In IEEE 802.11 WLAN the oscillator precision tolerance is specified to be less than +/−20 ppm, so that CFO is in the range from −40 ppm to +40 ppm. For example, if the TX oscillator is operated at 20 ppm below the nominal frequency and if the RX oscillator is operated at 20 ppm above, then the received baseband signal will have a carrier frequency error of 40 ppm. With a carrier frequency of 5.4 GHz in this standard, the CFO is up to 216 KHz. Every crystal oscillator manufacturer releases the output frequency tolerance ("df/f") over time (ms, seconds, and hours) and temperature to indicate the stability of the oscillator for user's particular application (more stable crystal oscillators tend to be more expensive).

Operationally, the techniques herein provide a machine-learning-based demodulator frequency prediction framework that expedites and ease the complexity associated with the CFO search process of multi-packet receivers. In particular, the predicted CFOs enable the frequency demodulator to extract the desired packet efficiently among interferences.

Figure 5:
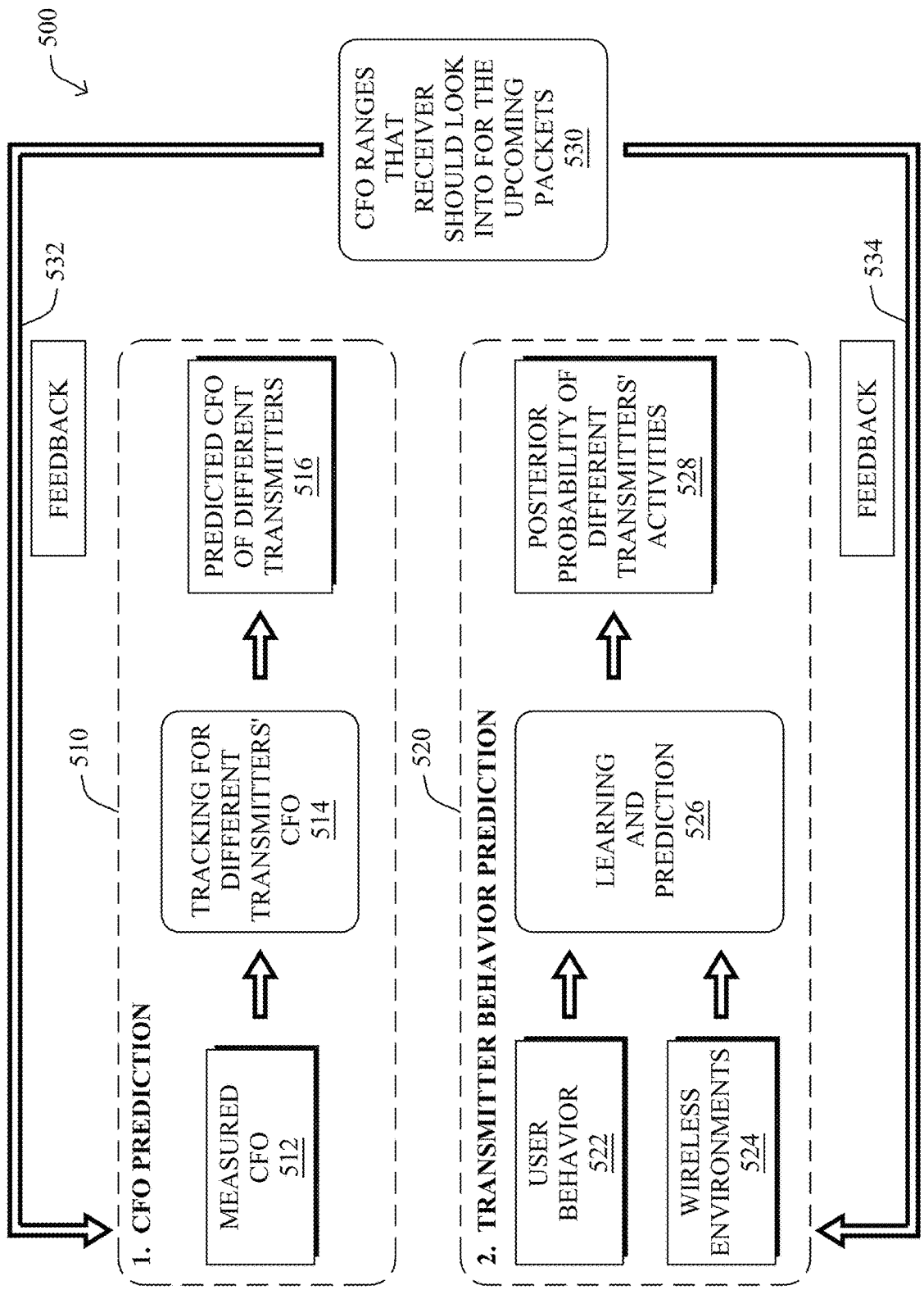
FIG. 5 illustrates an example of a frequency offset prediction framework according to one or more embodiments herein.

As depicted in FIG. 5, the proposed frequency offset prediction framework 500 is comprised of three primary blocks:

1. CFO prediction 510: Client/transmitter carrier frequency offset profiler and tracker. In particular, the techniques herein measure CFOs (512) and track the different transmitters' CFOs (514) for input into a machine-learning-based prediction for CFOs of different transmitters (516). That is, block 510 comprises tracking and predicting the CFO of previously identified transmitters over the course of their activity period based on their previously observed states (phase/frequency). Illustratively, the techniques herein use Kalman filtering for the frequency tracking and filtering component 510, as described in greater detail below.
2. Transmitter behavior prediction 520: Machine-learning-based client transmit behavior predictor. By inputting user/transmitter behavior (522) and the wireless environment (524) into a learning and prediction algorithm (526), block 520 predicts the posterior probability of a different transmitters' activities (528), i.e., the probability of a specific transmitter being active at a given time (e.g., at a time of a collided packet reception). That is, the learning-based techniques herein use received packets to make predictions as to behavior of future transmissions, thus producing a list (e.g., ranked) of the most probable transmitters at a given time (e.g., in a next time slot), thus producing a higher probability of listening on the right CFO at the right time. Illustratively, as detailed below, block 520 may use an Artificial Neural Network (ANN), or other regressive, linear, non-linear, statistical, or other machine learning techniques as a behavior predictor.
3. Output of CFO ranges 530: The combination of CFO predictions 510 and transmitter behavior predictions 520 produces CFO ranges 530 that the receiver(s) should look into for the upcoming packets. That is, as alluded to above, the predictions as to behavior of future transmissions produce a list of the most probable transmitters at a given time, which, when combined with the most likely CFO for those transmitters, results in prioritized list of CFOs that the receiver should be listening on at a particular time in order to have a high chance of decoding a single, or more particularly, a collided packet. The results of the algorithm's success (a hit/miss in terms of being on the right CFO at the right time) can then be fed back to each particular block 510 and 520 (532 and 542, respectively) to refine the results, accordingly.

Figure 6:
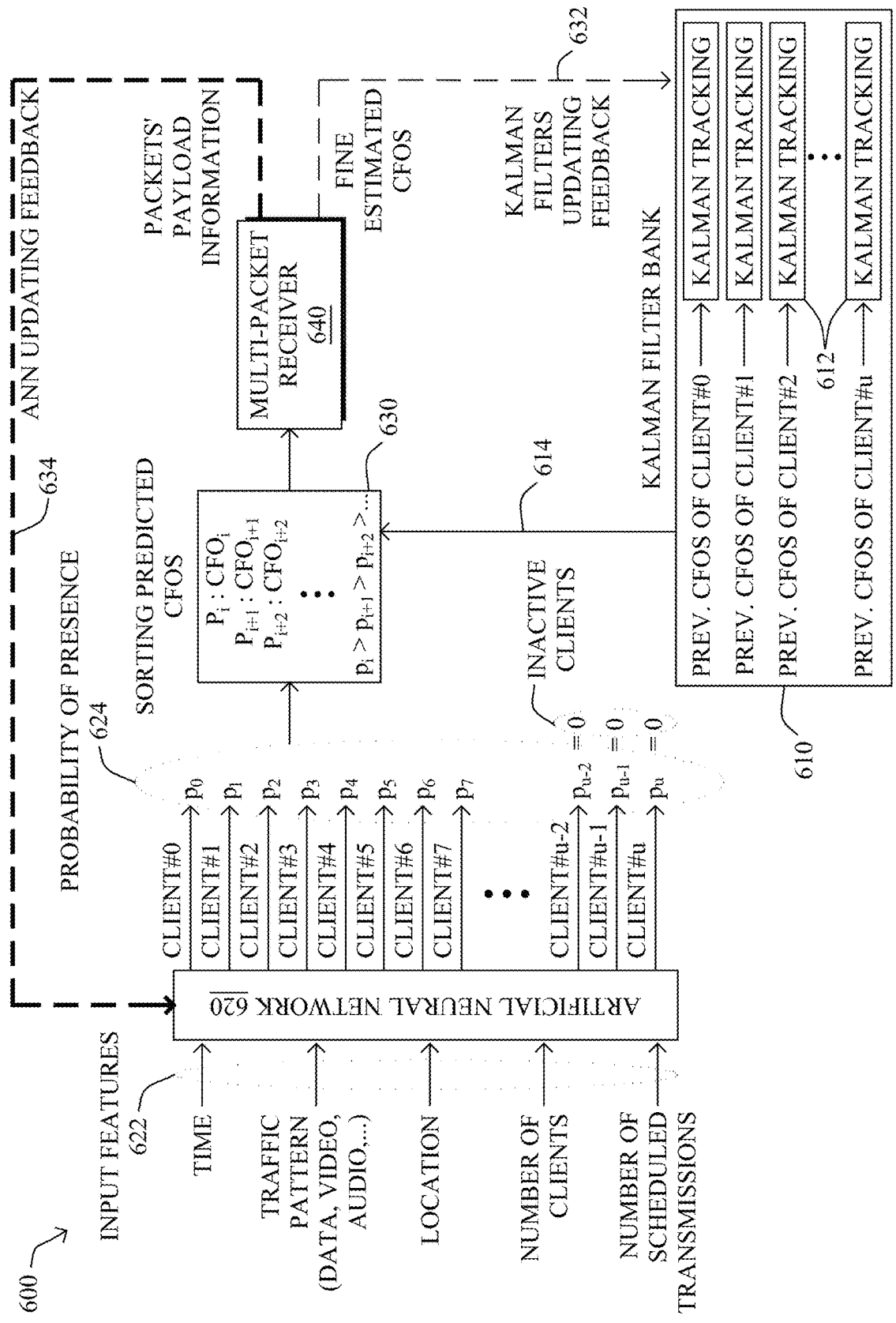
FIG. 6 illustrates a more detailed example of a frequency offset prediction framework according to one or more embodiments herein.

Notably, in conjunction with FIG. 5, FIG. 6 illustrates an example flow 600 of the proposed ML-based CFO prediction technique described herein (described in conjunction with FIG. 5).

Regarding CFO prediction block 510 (now also 610 in FIG. 6), it has been shown that Kalman filtering can be quite effective at estimating and predicting the time-varying phase and frequency offsets in each independent transmit/receive oscillator pair and, consequently, in enabling distributed beamforming with devices using low-cost oscillators. This is particularly important that the Distributed MIMO systems tend to have stringent synchronization (i.e., CFO estimation and prediction) requirements. Moreover Kalman predictors have been used for the purpose of phase and frequency offset tracking using pilot signals in OFDM receivers and more specifically in 802.11 based ones. In an embodiment herein, the particular predictor can be an extended (non-linear) Kalman filter with two parameters: phase of the received symbol and modulation frequency/CFO of the received signal.

To predict phase and frequency offset, the state equation of the extended Kalman filter algorithm can be written as:

$$\begin{bmatrix} \theta_k \\ \omega_k \end{bmatrix} = \begin{bmatrix} \theta_{k-1} \\ \omega_{k-1} \end{bmatrix} + L_k \left\{ \begin{bmatrix} Z_k^I \\ Z_k^Q \end{bmatrix} - \begin{bmatrix} u_k^I & -u_k^Q \\ u_k^Q & u_k^I \end{bmatrix} \begin{bmatrix} \cos\theta_{k-1} \\ \sin\theta_{k-1} \end{bmatrix} \right\} \quad [\text{Eq. 1}]$$

and $$\begin{bmatrix} \theta_{k+1} \\ \omega_{k+1} \end{bmatrix} = \begin{bmatrix} 1 & 1 \\ 0 & 1 \end{bmatrix} \begin{bmatrix} \theta_k \\ \omega_k \end{bmatrix} \quad [\text{Eq. 2}]$$

The corresponding error covariance update equations are:

$$\sum_k = \sum_{k-1} - \sum_{k-1} H_k \Omega_k^{-1} H_k' \sum_{k-1} \quad [\text{Eq. 3}]$$

and $$\sum_{k+1} = F_k \sum_k F_k' + G_k Q_k G_k' \quad [\text{Eq. 4}]$$

where $$F_k = \begin{bmatrix} 1 & 1 \\ 0 & 1 \end{bmatrix}, G_k = 1 \quad [\text{Eq. 5}]$$

$$H_k' = \begin{bmatrix} -u_k^I \sin\theta_{k-1} & -u_k^Q \cos\theta_{k-1} & 0 \\ -u_k^Q \sin\theta_{k-1} & -u_k^I \cos\theta_{k-1} & 0 \end{bmatrix} \quad [\text{Eq. 6}]$$

| | |
|---|---|
| $\theta_k$ | Phase offset at the k-th time instant |
| $\omega_k$ | Frequency offset at the k-th time instant |
| $\theta_{k-1}$ | Phase offset at the (k-1)-th time instant |
| $\omega_{k-1}$ | Frequency offset at the (k-1)-th time instant |
| $L_k$ | Kalman gain |
| $z_k^I$ | System observation (In-phase components of the output signals with a carrier mismatch between the transmitter and the receiver) |
| $z_k^Q$ | System observation (Quadrature components of the output signals with a carrier mismatch between the transmitter and the receiver) |
| $u_k^I$ | Transmitted in-phase components |
| $u_k^Q$ | Transmitted quadrature components |
| $\Sigma_{k-1}, \Sigma_k$ | A-priori and a-posteriori error covariance |

TABLE 1: Variable Definitions

Each particular client (e.g., Client #0, Client #1, Client #2, etc.) can have their own previous CFOs input into an individual Kalman tracking algorithm 612 of a filter bank 610, the results of which can then be output (614) to the ranked CFO range of block 530/630 (sorting of predicted CFOs based on the probability of presence from block 520/620, as described below).

Again, it is important to note that extended or linear Kalman filters can take on many forms with different state and measurement equations along with various linearization and non-linear models of the CFO prediction. The intent here has been to provide a more generic embodiment of the Kalman filter used in the illustrative framework described herein. For instance, a clock skew and offset based model may be used for the state equation of the Kalman filter. Regardless of the state equations, and models, the measurement equation is based on the feedback/observation of phase and frequency offset provided from the multi-packet receivers' modem (the feedback line 632 in FIG. 6, 532 in FIG. 5). Therefore, if a particular client/transmitter has not been active for a long period of time (e.g., minutes), there will be some time before the Kalman tracking mechanism converges for that client, when it becomes active again. For that period of time multi-packet receivers may not achieve the full efficiency promised by the scheme here, until the predictions begin to account for that client's revived activity.

Turning now to the neural network transmitter behavior prediction (block 520 in FIG. 5, and ANN 620 in FIG. 6, generally), user behavior prediction has become an advanced research topic recently. Many user behavior prediction models and algorithms have been proposed in the past few years using regressive statistical or machine learned models. In an embodiment of the client/transmitter behavior prediction, a back propagation trained Feed-Forward Artificial Neural Network (FFANN) architecture may be utilized in order to realize the same or approximate input-output mapping relationship between environmental parameters data and probability of each known transmitter's activity for a time epoch, which are accordingly defined as input and output of the FFANN. (Artificial Neural Networks (ANNs) have been known to provide direct estimation of the posterior probabilities for the relation between inputs and outputs while often fitting the training data very well and, thus, have low bias in their classification.) A multi-layer perceptron may preferably be comprised of units with Rectified Linear Unit (ReLU) activation function for low computational overhead implementation. In particular, the input parameters/features 622 to the FFANN are (but not limited to) location of clients, device type, traffic pattern (Video, Audio, Data), number of devices, number of scheduled transmissions, and time of day.

As multi-packet receivers detect and decode each packet and determine the particular transmitter/s the packet(s) came from, the decoded packet information and parameters can be used to train the Neural Network in real time in a supervised manner, illustratively at the controller or in the cloud, using Error Back Propagation. The exemplar (training sample) consists of the parameters extracted from the network (locations, traffic pattern, time of day, etc.) and the output for the exemplar, namely the probability of presence 624, are either 0's (zeros) for $p_i$'s for all clients except the one that transmitted the packet, which has a value of 1 (one). If there are simultaneous packets decoded by multi-packet receivers then the training associated with each is performed sequentially, while bearing the same time stamp at the input. (Note that feedback 534 is also shown in FIG. 6 as 634, i.e., the packet's payload information.)

In order to initialize the weights of the FFANN, one can opt for offline training with multi-packet receivers in the same manner as described above, except that multi-packet receivers would have to apply exhaustive frequency search for separating the colliding packets for the duration of offline training.

Notably, many different architectures of Artificial Neural Networks can be applied to this problem. For example, Convolutional Neural Networks with deep learning is also a good fit for the behavior prediction problem given temporal character of behavior prediction, as are many non-linear, non-parametric regression based statistical prediction methods.

As can be seen in FIG. 6, the prediction of CFO for each active transmitter (output 614 from block 610/510), in conjunction with the probability of every transmitter's activity (output 624 from block 620/520), can organized as a prioritized list of frequencies (CFOs) (block 630/530) that can be sent to multi-packet receivers 640 to directly jump to, in order to decode the colliding or single packets. This way, there is an increased chance of decoding a received packet while avoiding a granular and exhaustive search of at least a portion of the spectrum, saving time and complexity for the receiver.

Notably, the framework described herein enables multi-packet receivers to perform decoding of colliding packets with lower latency and complexity. The lower latency is associated with the a priori knowledge of which frequency to demodulate at, therefore avoiding the time required for the receiver and clock circuitry to switch through a sequentially granular demodulation process. The complexity (cycles and memory) savings is associated with the fact that at each demodulation frequency, an assessment of the strength of the signal at that frequency needs to be made by multi-packet receivers in order to determine if the demodulated data can be effectively extracted for post processing. Performing sequential power assessment will then incur a fair amount of complexity to the multi-packet receivers' DSP processor, which can be eased through utilizing the techniques herein. On the other hand, there is an overhead associated with linear and non-linear filtering (e.g., Kalman and FFANN) in both application and training. It is noteworthy that both components 510 and 520 in FIG. 5 can be implemented at the cloud, at the AP controller, or, at the edge AP. The FFANN application is not cycle intensive, whereas the training can be. Therefore the training, which is typically a slow and gradual process, can be implemented at the controller or the cloud, while the application of FFANN may best be suited for the controller or at the AP namely for latency requirements. The same can be said of the Kalman training and application. In case the training is in the cloud/controller and application of the filters at the AP, the weights of both filters may be updated through a dedicated AP-Cloud or AP-Controller connection (e.g., multigigabit technology connections).

Figure 7:
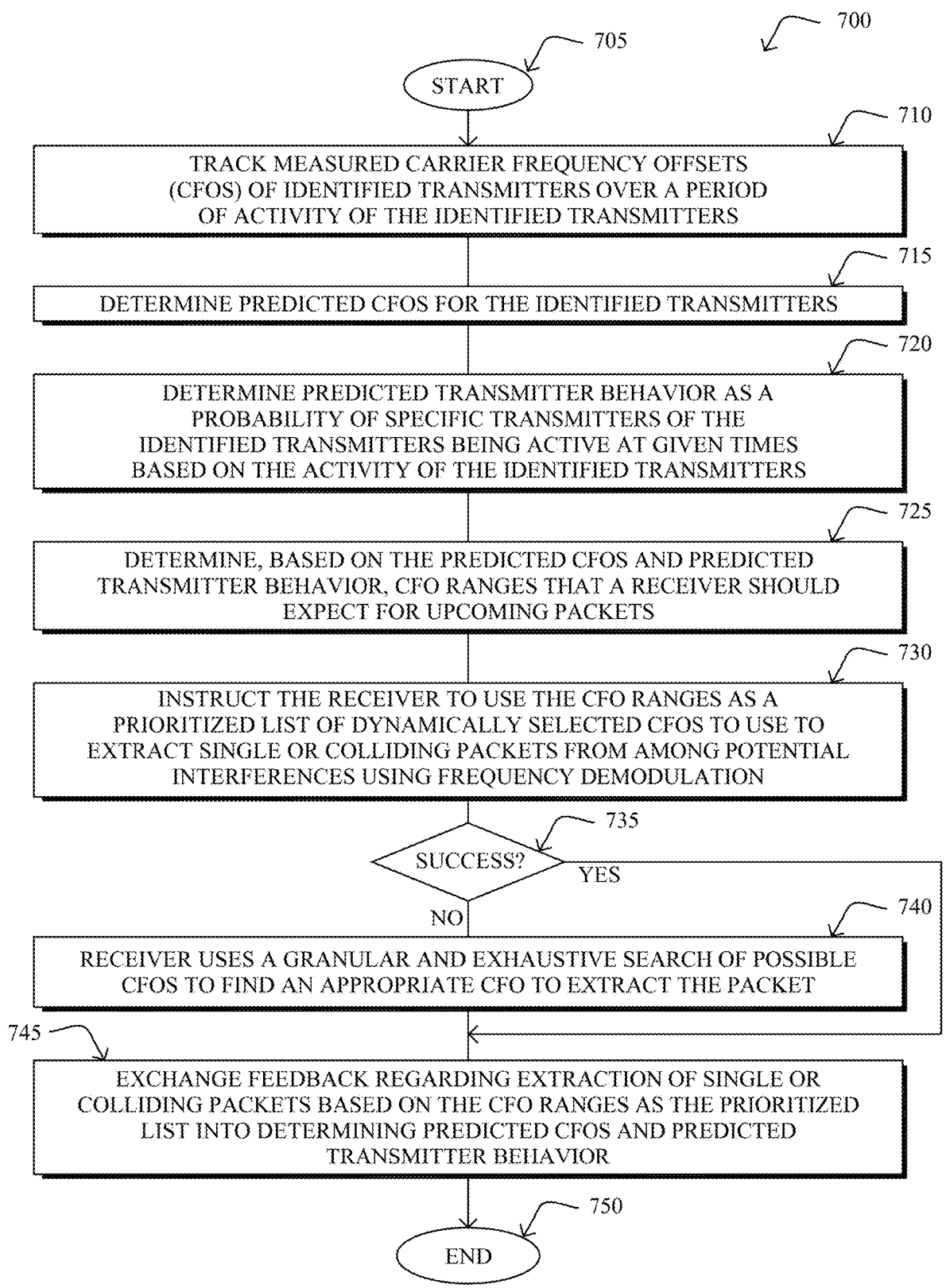
FIG. 7 illustrates an example simplified procedure for optimized frequency searching for simultaneously received packet detection according to one or more embodiments herein.

In closing, FIG. 7 illustrates an example simplified procedure for optimized frequency searching for simultaneously received packet detection in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the techniques herein track measured carrier frequency offsets (CFOs) of identified transmitters over a period of activity of the identified transmitters. Through this, in step 715, the techniques herein may then determine predicted CFOs for the identified transmitters, such as based on a Kalman filter (e.g., an extended, non-linear Kalman filter with inputs comprising phases of received symbols and CFOs of received signals), as detailed above.

In addition, in step 720, the techniques herein determine predicted transmitter behavior as a probability of specific transmitters of the identified transmitters being active at given times based on the activity of the identified transmitters. That is, as mentioned above, machine learning algorithms such as an ANN (e.g., a back-propagation trained FFANN), or other types, such as convolution neural networks, or non-linear, non-parametric regression-based statistical prediction models, among others, can be used to predict when a particular transmitter is likely to send its next packet/transmission. For instance, by inputting transmitter behavior of the identified transmitters and wireless environment parameters into a machine learning algorithm, the techniques herein can then receive output from the machine learning algorithm that is a posterior probability of future transmission actions of the identified transmitters. Notably, inputs to determining the predicted transmitter behavior may generally be such things as, for example, transmitter location, transmitter type, traffic pattern (e.g., video, audio, data, etc.), number of transmitters, number of scheduled transmissions, time of day, and so on.

Based on the predicted CFOs and predicted transmitter behavior, therefore, in step 725 the techniques herein may determine CFO ranges that a receiver should expect for upcoming packets, and may then instruct the receiver in step 730 to use the CFO ranges as a prioritized list of dynamically selected CFOs to use to extract single or colliding packets from among potential interferences using frequency demodulation.

In the rare event that the selected CFOs for a given time are not successful in extracting packets (a predictive "miss" in step 735), then in step 740 the receiver, in response to failing to extract a packet using the CFO ranges of the prioritized list, uses a granular and exhaustive search of possible CFOs to find an appropriate CFO to extract the packet.

After an initial success (a predictive "hit" in step 735) or after an exhaustive search in step 740, then in step 745 the participating devices may correspondingly exchange feedback regarding extraction of single or colliding packets based on the CFO ranges as the prioritized list into determining predicted CFOs and predicted transmitter behavior (e.g., between the receiver and the device performing the machine learning predictions, as described above). Notably, in one embodiment the process itself may be located on an AP, and thus the receiver is also located at the AP. In an alternative embodiment, however, the process may be located at one of either a cloud server or an AP controller, and the receiver is located at an AP (e.g., an edge AP).

The illustrative and simplified procedure 700 may then end in step 750, notably with the ability to continue making predictions for CFOs and transmitter behavior in order to provide prioritized CFOs to efficiently extract/decode single or colliding packets using the techniques herein, accordingly. Note also that the techniques herein allow for adaptations over time, such as where behaviors change, CFOs change, seasonality affects the behavior, and so on, and the techniques further can adjust the models and predictions while continuing to make predictions over short-term time periods as well as long-term time periods.

The techniques described herein, therefore, provide for optimized frequency searching for simultaneously received packet detection. In particular, the framework proposed herein reduces the latency of multi-packet receiver packet processing by predicting the most probable transmitters in each time interval and thus the most likely corresponding CFOs with high probability, such that when multiple collided packets are received in multi-packet receivers, SoP detection can occur with much delay (and less computation), most of the time. That is, by not only tracking the CFO of different clients, but also predicting the possible transmission of different sources (each associated with a different CFO) based on a history of behavior, the techniques herein can predict, with high probability, a likely CFO range for a given time, rather than merely estimating CFOs that may be in use more often than not. In other words, the techniques herein specifically enhance the start of packet (SoP) detection of multi-packet receivers, which requires simultaneous decoding of multiple packets. In addition, in certain embodiments, the techniques herein further ease the multi-packet receivers' processing needs per packet at the DSP (AP hardware) by shifting much of the overhead associated with the various predictive measures to the controller/cloud.

While there have been shown and described illustrative embodiments above, it is to be understood that various other adaptations and modifications may be made within the scope of the embodiments herein. For example, while certain embodiments are described herein with respect to using certain machine learning models, the models are not limited as such and others may be used as appropriate in other embodiments. In addition, while certain protocols are shown, such as 802.11, other suitable protocols may be used, accordingly. In addition, while an illustrative multi-packet receiver is the EverScale receiver available from Cisco Systems, Inc, other multi-packet receivers may benefit from the techniques herein to efficiently detect simultaneously received packets.

In still further embodiments, in particular, though the techniques herein have been generally described in relation to efficiently detecting simultaneously received packets, the present disclosure need not be so limited, and may be applicable to other wireless packet reception technologies as well. For example, while the embodiments above have focused on collision-based packet decoding, other types of dynamically adjusted wireless properties may benefit from the techniques herein, where efficiencies from predicted behavior could reduce the overall scanning/searching time for a number of wireless technologies. For instance, "sniffer" radios or scanners can build profiles on what center frequencies to best search or start at, beamforming and/or MIMO antenna arrays could predict which reception parameters to tune in order to best receive particular transmissions in a particular direction, devices that focus on an entire channel or a smaller subset of an entire channel could determine which portions of a spectrum to focus on, which offsets on a channel to use, or which offset to use on a different channel, and so on. Still further examples may focus on spatial signatures, allowing a receiver to tune to a given spatial signature at the predicted time to receive a particular packet expected at that time based on prior behavioral analytics.

Figure 8:
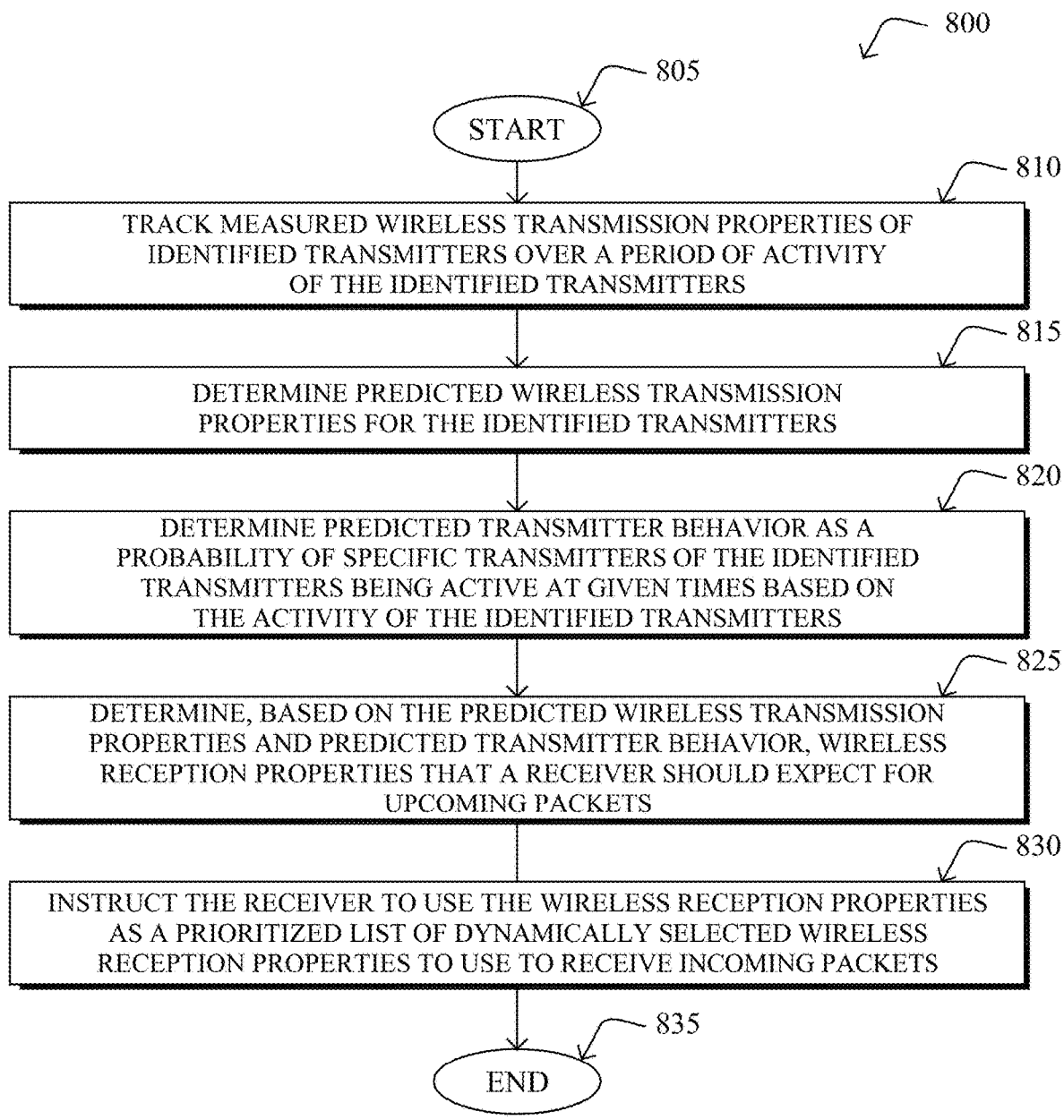
FIG. 8 illustrates an example simplified procedure for prediction-based efficient packet reception according to one or more embodiments herein.

In particular, FIG. 8 illustrates an example simplified procedure for prediction-based efficient packet reception, generally, in accordance with one or more embodiments described herein. For example, a non-generic, specifically configured device (e.g., device 200) may perform procedure 800 by executing stored instructions (e.g., process 248). The procedure 800 may start at step 805, and continues to step 810, where any measured wireless transmission properties of identified transmitters can be tracked over a period of activity of the identified transmitters, in order to determine, in step 815, predicted wireless transmission properties for the identified transmitters, and, in step 820, predicted transmitter behavior as a probability of specific transmitters of the identified transmitters being active at given times based on the activity of the identified transmitters. As such, in step 825, a system in accordance with the techniques herein may then determine, based on the predicted wireless transmission properties and predicted transmitter behavior, wireless reception properties that a receiver should expect for upcoming packets, thus allowing in step 830 for instructing the receiver to use the wireless reception properties as a prioritized list of dynamically selected wireless reception properties to use to receive incoming packets. (Note that in this embodiment, wireless transmission properties and wireless receiver properties may generally be anything relevant and dynamically tunable, such as center frequencies, CFOs, channels, channel offsets, beamforming directions, and so on.

The illustrative procedure 800 may then end in step 835, notably with the ability to continue making predictions for efficiently receiving packets using the techniques herein, accordingly.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
tracking, by a process, measured carrier frequency offsets (CFOs) of identified transmitters over a period of activity of the identified transmitters;
determining, by the process, predicted CFOs for the identified transmitters;
determining, by the process, predicted transmitter behavior as a probability of specific transmitters of the identified transmitters being active at given times based on the activity of the identified transmitters;
determining, by the process, based on the predicted CFOs and predicted transmitter behavior, CFO ranges that a receiver should expect for upcoming packets; and
instructing, by the process, the receiver to use the CFO ranges as a prioritized list of dynamically selected CFOs to use to extract single or colliding packets from among potential interferences using frequency demodulation.

2. The method as in claim 1, wherein determining predicted transmitter behavior comprises:
inputting transmitter behavior of the identified transmitters into a machine learning algorithm;
inputting wireless environment parameters into the machine learning algorithm; and
receiving output from the machine learning algorithm that is a posterior probability of future transmission actions of the identified transmitters.

3. The method as in claim 1, wherein determining predicted CFOs for the identified transmitters is based on a Kalman filter.

4. The method as in claim 3, wherein the Kalman filter comprises an extended, non-linear Kalman filter with inputs comprising phases of received symbols and CFOs of received signals.

5. The method as in claim 1, wherein determining predicted transmitter behavior is based on an artificial neural network (ANN).

6. The method as in claim 5, wherein the ANN comprises a back-propagation trained feed-forward ANN (FFANN).

7. The method as in claim 1, wherein determining predicted transmitter behavior is based on a convolutional neural network.

8. The method as in claim 1, wherein determining predicted transmitter behavior is based on a non-linear, non-parametric regression-based statistical prediction model.

9. The method as in claim 1, wherein inputs to determining predicted transmitter behavior are selected from a group consisting of: transmitter location; transmitter type; traffic pattern; number of transmitters; number of scheduled transmissions; and time of day.

10. The method as in claim 1, wherein the receiver, in response to failing to extract a packet using the CFO ranges of the prioritized list, uses a granular and exhaustive search of possible CFOs to find an appropriate CFO to extract the packet.

11. The method as in claim 1, wherein the process is located on an access point (AP), and wherein the receiver is located at the AP.

12. The method as in claim 1, wherein the process is located at one of either a cloud server or an access point (AP) controller, and wherein the receiver is located at an AP.

13. The method as in claim 1, further comprising:
exchanging feedback regarding extraction of single or colliding packets based on the CFO ranges as the prioritized list into determining predicted CFOs and predicted transmitter behavior.

14. An apparatus, comprising:
one or more network interfaces to communicate with a network;
a processor coupled to the network interfaces and configured to execute one or more processes; and
a memory configured to store a process executable by the processor, the process, when executed, configured to:
tracking measured carrier frequency offsets (CFOs) of identified transmitters over a period of activity of the identified transmitters;
determining predicted CFOs for the identified transmitters;
determining predicted transmitter behavior as a probability of specific transmitters of the identified transmitters being active at given times based on the activity of the identified transmitters;
determining based on the predicted CFOs and predicted transmitter behavior, CFO ranges that a receiver should expect for upcoming packets; and
instructing the receiver to use the CFO ranges as a prioritized list of dynamically selected CFOs to use to extract single or colliding packets from among potential interferences using frequency demodulation.

15. The apparatus as in claim 14, wherein determining predicted CFOs for the identified transmitters is based on a Kalman filter, and wherein determining predicted transmitter behavior is based on one of either an artificial neural network (ANN) or a convolutional neural network.

16. The apparatus as in claim 14, wherein the receiver, in response to failing to extract a packet using the CFO ranges of the prioritized list, uses a granular and exhaustive search of possible CFOs to find an appropriate CFO to extract the packet.

17. The apparatus as in claim 14, wherein the apparatus is an access point (AP), and wherein the receiver is one of the one or more network interfaces.

18. The apparatus as in claim 14, wherein the apparatus is one of either a cloud server or an access point (AP) controller, and wherein the receiver is located at an AP.

19. A method, comprising:
tracking, by a process, measured wireless transmission properties of identified transmitters over a period of activity of the identified transmitters;
determining, by the process, predicted wireless transmission properties for the identified transmitters;
determining, by the process, predicted transmitter behavior as a probability of specific transmitters of the identified transmitters being active at given times based on the activity of the identified transmitters;
determining, by the process, based on the predicted wireless transmission properties and predicted transmitter behavior, wireless reception properties that a receiver should expect for upcoming packets; and
instructing, by the process, the receiver to use the wireless reception properties as a prioritized list of dynamically selected wireless reception properties to use to receive incoming packets.

20. The method as in claim 19, wherein the wireless transmission properties and wireless receiver properties are selected from a group consisting of: center frequencies, carrier frequency offsets (CFOs), channels, channel offsets, and beamforming directions.

\* \* \* \* \*